May 7, 1963  C. J. PERZYK  3,089,047
DYNAMOELECTRIC MACHINE
Filed Dec. 24, 1959  2 Sheets-Sheet 1
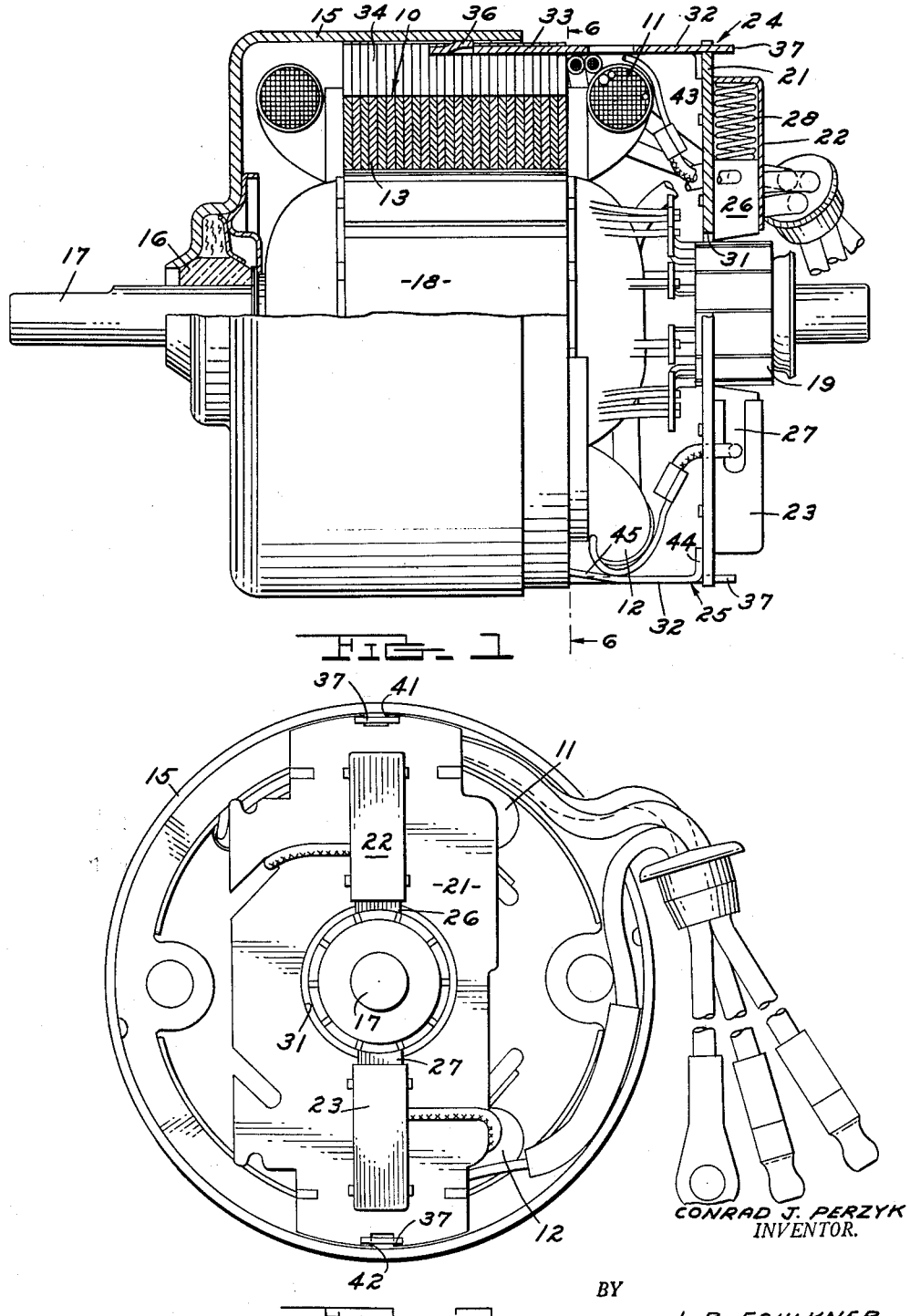
CONRAD J. PERZYK
INVENTOR.
BY
J. R. FAULKNER
K. L. ZERSCHLING
ATTORNEYS May 7, 1963 C. J. PERZYK 3,089,047
DYNAMOELECTRIC MACHINE
Filed Dec. 24, 1959 2 Sheets-Sheet 2
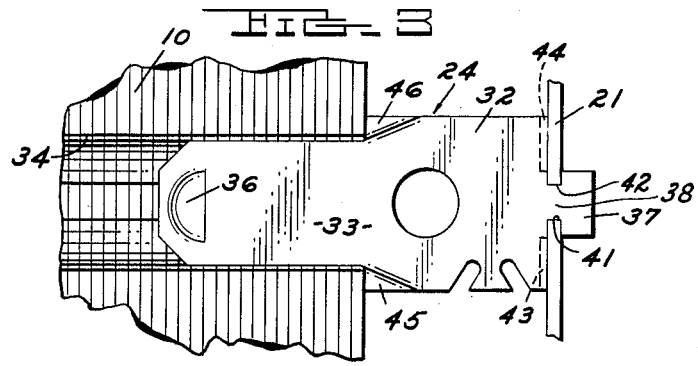
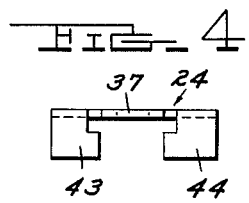
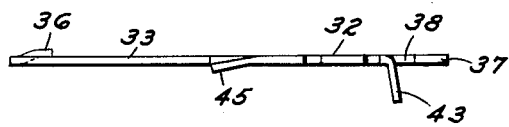
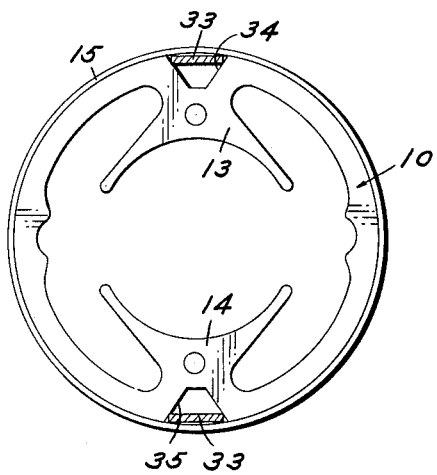
CONRAD J. PERZYK
INVENTOR.
BY J. R. FAULKNER
K. L. ZERSCHLING
ATTORNEYS

United States Patent Office 3,089,047
Patented May 7, 1963

1

3,089,047
DYNAMOELECTRIC MACHINE
Conrad J. Perzyk, Tipton, Mich., assignor to Ford Motor Company, Dearborn, Mich., a corporation of Delaware
Filed Dec. 24, 1959, Ser. No. 861,848
1 Claim. (Cl. 310—239)

This invention relates to a dynamoelectric machine and more particularly to brush mountings for a dynamoelectric machine of the fractional horsepower type.

In small fractional horsepower dynamoelectric machines a need exists for simple inexpensive devices for mounting the brushes of the machine in engagement with the armature commutator. The present invention meets this need by providing a brush card holder or bracket which can be constructed of sheet metal stampings. The brush card holder includes a retaining tongue which is positioned between the frame of the machine and the housing. A T-shaped end portion of the brush card holder engages a slot in a brush card to rigidly hold the brush card in proper position with respect to the armature commutator. The brushes are supported from the brush card by conventional means and are spring urged against the armature commutator.

An object of the present invention is the provision of a simple inexpensive device for mounting the brushes of a small dynamoelectric machine.

A further object of the invention is the provision of a brush card holder for rigidly mounting a brush card of a small dynamoelectric machine.

Other objects and attendant advantages of the invention can readily be appreciated when the specification is considered in connection with the accompanying drawings in which:

FIG. 1 is an elevational view partially in section of a part of a dynamoelectric machine employing the present invention;

FIG. 2 is an end view of the dynamoelectric machine shown in FIG. 1;

FIG. 3 is a top plan view of the brush card holder of the present invention together with a portion of the frame and the brush card;

FIG. 4 is a front elevational view of the brush card holder shown in FIG. 3;

FIG. 5 is a side elevational view of the brush card holder shown in FIG. 3; and

FIG. 6 is a sectional view taken along the lines 6—6 of FIG. 1 with the armature removed.

Referring now to the drawings in which like reference numerals designate like parts throughout the several views thereof there is shown in FIGS. 1 and 2 a dynamoelectric machine of the fractional horsepower type which includes a laminated frame 10 having a pair of field coils 11 and 12 wound about integrally formed pole pieces 13 and 14. A pair of cup housings are positioned about the laminated frame and one of these housings is shown at 15. It is understood that an identical housing which, for reasons of clarity, has not been shown is positioned over the other half of the dynamoelectric machine. The cup housing 15 and the other housing (not shown) are secured together by a plurality of conventional through bolts (not shown). Each cup housing includes a self lubricated sealed bearing, as shown at 16, for rotatably supporting an armature shaft 17. The armature shaft supports an armature 18 including a commutator 19.

A brush card 21 having mounted thereon a pair of brush containers 22 and 23 is positioned over the commutator by means of a pair of brush card holders generally designated by the numerals 24 and 25. A pair of brushes 26 and 27 are positioned in brush containers 22 and 23 and are urged against the commutator 19 by a pair of springs, one of which is shown at 28. The

2 brush card 21 has a central aperture 31 of larger diameter than the commutator 19 so that the commutator may rotate freely with respect to the brush card.

The details of the brush card holders 24 and 25 can best be understood by reference to FIGS. 1, and 3 through 5. The brush card holders are identical in structure and include a body portion 32 having a retaining tongue 33 extending from one end thereof. The retaining tongues 33 fit into longitudinal slots 34 and 35 in the laminated frame 10. As can best be seen by reference to FIG. 6, the width of the tongues 33 is approximately equal to the widest portion of slots 34 and 35 so that the brush holders 24 and 25 are positioned at the outer periphery of the frame in close proximity to the cup housings. A struck detent 36 in each tongue engages the housing 15 as can best be seen by reference to FIG. 1.

The body portion of each brush card holder has a T-shaped tongue including a T-bar 37 and a neck 38 extending therefrom. The neck 38 of each brush card holder has a length approximately equal to the thickness of the brush card. The necks fit into slots 41 and 42 positioned in opposite ends of the brush card so that the T-bars firmly engage one side of the brush card as can best be seen by reference to FIG. 3.

The body portion of each brush card holder includes a first tab 43 positioned adjacent one side of the neck 38 and a second tab 44 positioned adjacent the other side of the neck 38. These tabs extend at substantially right angles to the body portions of the brush card holders toward the center of the dynamoelectric machine and engage the side of the brush card opposite to that engaged by the T-bars 37. The body portion also includes a third tab 45 positioned adjacent one side of retaining tongue 33 and a fourth tab 46 positioned adjacent the other side of retaining tongue 33. These two tabs are formed by bending over the corners of body portion 32 at a slight angle thereto. They engage the laminated frame 10 to limit the movement of the brush card holders in a direction toward the frame. The detents 36 in the tongues 33 restrain the movement of the brush cards in a direction away from the laminated frame 10.

The brush card 21 is thus securely positioned between the T-bars 37 and the tabs 43 and 44 of each of the brush card holders, and the brush card holders are securely positioned with respect to the frame 10 and the cup housing 15 by the tongues 33 and detents 36. The cup housing opposite to cup housing 15 will, when in place, be positioned over the T-shaped tongues on each of the brush card holders and will prevent the necks 38 from moving radially out of the slots 41 and 42 in the brush card.

Thus the present invention provides a simple inexpensive device for rigidly mounting brush cards in a small dynamoelectric machine.

It will be understood that the invention is not to be limited to the exact construction shown and described, and that various changes and modifications may be made without departing from the spirit and scope of the invention, as defined in the appended claim.

What is claimed is:

In a dynamoelectric machine having a frame with a pair of longitudinal slots positioned therein and a housing fitting over said frame, a brush card, said brush card having a slot positioned in each end thereof, a pair of brush card holders, each brush card holder comprising a body portion, a retaining tongue including a detent extending from said body portion, a T-shaped tongue extending from said body portion and including a T-bar and a neck, the retaining tongue of one of said brush card holders being positioned in one of the longitudinal slots in said frame, the retaining tongue of the other of said brush card holders being positioned in the other of the longitudinal slots in said frame with the detents on said tongues engaging said housing, the neck of one of said brush card holders being positioned in one of the slots in said brush card, the neck of the other of said brush card holders being positioned in the other slot in said brush card so that said T-bars engage one side of said brush card, each of the body portions of the brush card holders including a first tab positioned adjacent one side of the neck of the T-shaped tongue and a second tab positioned adjacent the other side of the neck of the T-shaped tongue, said first and second tabs extending at substantially right angles to the body portion of each brush card holder toward the center of said dynamoelectric machine and engaging the other side of said brush card, each body portion also including a third tab positioned adjacent one side of the retaining tongue and a fourth tab positioned adjacent the other side of the retaining tongue, said third and fourth tabs of each body portion extending into engagement with the frame of the dynamoelectric machine to limit the movement of said brush card holders with respect to said frame in one direction, the detents on the retaining tongues limiting the movement of said brush card holders in the other direction.

References Cited in the file of this patent

UNITED STATES PATENTS

| | | |
|---|---|---|
| 2,504,564 | Merriam | Apr. 18, 1950 |
| 2,629,061 | Swarthout | Feb. 17, 1953 |
| 2,780,744 | Carneck | Feb. 5, 1957 |